(12) United States Patent
Singh et al.

(10) Patent No.: US 8,659,994 B2
(45) Date of Patent: Feb. 25, 2014

(54) METHOD AND SYSTEM FOR COMMUNICATING MULTICAST TRAFFIC OVER PROTECTED PATHS

(75) Inventors: Bijendra Singh, Plano, TX (US); Calvin Wan, Plano, TX (US); Arindam Paul, Plano, TX (US); Swati Mittal, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 348 days.

(21) Appl. No.: 12/905,199

(22) Filed: Oct. 15, 2010

(65) Prior Publication Data

US 2012/0093152 A1 Apr. 19, 2012

(51) Int. Cl.
*H04J 3/14* (2006.01)
*H04L 12/26* (2006.01)
*H04L 12/56* (2011.01)
*H04J 14/00* (2006.01)
*G06F 11/00* (2006.01)
*G06F 15/173* (2006.01)

(52) U.S. Cl.
USPC ........... 370/218; 370/228; 370/390; 370/432; 398/5; 709/239; 714/2

(58) Field of Classification Search
USPC ...................... 370/218, 228, 390, 432; 398/5; 709/239; 714/2
See application file for complete search history.

(56) References Cited

U.S. PATENT DOCUMENTS

| | | | | |
|---|---|---|---|---|
| 6,169,741 B1 * | 1/2001 | LeMaire et al. | ............... | 370/401 |
| 6,662,308 B1 * | 12/2003 | Baroni et al. | ................... | 714/4.1 |
| 6,741,553 B1 * | 5/2004 | Grenier | ........................ | 370/218 |
| 6,952,395 B1 * | 10/2005 | Manoharan et al. | .......... | 370/219 |
| 6,977,891 B1 * | 12/2005 | Ranjan et al. | ................. | 370/229 |
| 7,170,854 B1 * | 1/2007 | Orrell et al. | .................... | 370/228 |
| 7,539,131 B2 * | 5/2009 | Shen | ............................. | 370/217 |
| 7,570,583 B2 * | 8/2009 | Broberg et al. | ............... | 370/219 |
| 7,590,120 B2 * | 9/2009 | Shuen et al. | ................... | 370/392 |
| 7,623,536 B2 * | 11/2009 | Kobayashi | .................... | 370/412 |
| 7,719,959 B2 * | 5/2010 | Shah et al. | ..................... | 370/220 |
| 7,804,767 B1 * | 9/2010 | Owens et al. | ................. | 370/217 |
| 7,848,225 B2 * | 12/2010 | Yang | ............................. | 370/216 |
| 7,848,324 B2 * | 12/2010 | Park | .............................. | 370/390 |
| 7,872,967 B2 * | 1/2011 | Chun et al. | .................... | 370/228 |
| 8,099,516 B1 * | 1/2012 | Cai | ................................ | 709/245 |
| 8,218,430 B2 * | 7/2012 | Zhao | ............................. | 370/218 |
| 2002/0021659 A1 * | 2/2002 | Meijen et al. | ................. | 370/217 |
| 2005/0041680 A1 * | 2/2005 | Tanaka et al. | ................. | 370/432 |
| 2005/0111474 A1 * | 5/2005 | Kobayashi | ..................... | 370/432 |

(Continued)

OTHER PUBLICATIONS

Extender European Search Report; Application No. 11184120.1-1249; pp. 6, Feb. 13, 2012.

(Continued)

*Primary Examiner* — Alpus H Hsu
(74) *Attorney, Agent, or Firm* — Baker Botts L.L.P.

(57) ABSTRACT

In accordance with embodiments of the present disclosure, a method is provided for communicating multicast traffic. The method may include in response to receipt of multicast control traffic at a network element to be communicated to a protection switching group, communicating the multicast control traffic to each of a working path and a protection path of the protection switching group. The method may also include in response to receipt of multicast control traffic via either of the working path and the protection path, processing the multicast control traffic as if the multicast control traffic was received via both the working path and the protection path.

21 Claims, 5 Drawing Sheets

(56) References Cited

U.S. PATENT DOCUMENTS

| | | | |
|---|---|---|---|
| 2007/0280236 A1* | 12/2007 | Yang | 370/390 |
| 2008/0049611 A1 | 2/2008 | Higashitaniguchi et al. | 370/228 |
| 2008/0068988 A1* | 3/2008 | Tochio | 370/228 |
| 2008/0175234 A1* | 7/2008 | Li | 370/389 |
| 2008/0175239 A1* | 7/2008 | Sistanizadeh et al. | 370/390 |
| 2008/0175269 A1 | 7/2008 | Alvarez et al. | 370/468 |
| 2008/0232246 A1* | 9/2008 | Jiang | 370/225 |
| 2008/0304407 A1* | 12/2008 | Umansky et al. | 370/222 |
| 2009/0109843 A1* | 4/2009 | Yang | 370/225 |
| 2010/0135291 A1* | 6/2010 | Martin et al. | 370/389 |
| 2012/0120793 A1* | 5/2012 | Corti | 370/228 |
| 2012/0147741 A1* | 6/2012 | Wei | 370/225 |
| 2012/0300619 A1* | 11/2012 | Fu et al. | 370/222 |

OTHER PUBLICATIONS

European Office Action; Application No. 11184120.1; pp. 4, Jun. 19, 2013.

* cited by examiner

METHOD AND SYSTEM FOR COMMUNICATING MULTICAST TRAFFIC OVER PROTECTED PATHS

TECHNICAL FIELD OF THE INVENTION

The present invention relates generally to optical networks and, more particularly, to a method and system for communicating multicast traffic over protected paths.

BACKGROUND

To ensure high reliability and availability in communications networks, protection switching is often used. When implemented, protection switching typically provides a primary or "working" path for a network and a redundant or "protection" path for the network. Accordingly, each path may be monitored, and if a failure is detected on the working path, network traffic may be switched to the protection path. An example of protection switching may be Ethernet Linear Protection Switching (ELPS) as defined by the ITU G.8031 standard.

To ensure loop-free topology in communications networks, spanning tree protocol (STP) may be employed by a network. A basic function of STP is to prevent loops and ensuing broadcast radiation that occurs in the presence of loops. To prevent loops, STP may determine if multiple paths exist between two network elements and break one of the paths if a loop would otherwise exist.

Because protection switching operates on the principle of maintaining two paths between network elements, a protection path may be detected by STP as a loop if STP is enabled on the network element ports comprising the protected path. If protected paths are detected as a loop by STP, STP may break one of the paths, thus rendering protection switching inoperable. In addition, protection switching may switch between a working path and a protection path without notifying switching, bridging, and/or routing protocols of network elements of the protection switch. Accordingly, in the event of a protection switch, switching, bridging, and/or routing protocols may become unaware of which of the two paths (working or protection path) is to be used for forwarding data. Moreover, upon a protection switch, a network element's switching or routing entries may need to be flushed and repopulated to point to the newly active path, which may result in an undesirable amount of dropped traffic and unnecessary flooding of traffic resulting in oversubscription.

Another problem relating to the interoperability of bridged and/or routed networks and protection switching is that in a network, multicast topology (e.g., multicast groups, recipient list of multicast receivers, etc.) may be "learned" on the active path (e.g., the working path) of a protection switching group and multicast traffic is forwarded to the active link as identified by a multicast group entry stored on a network element. If the active were to become disabled, STP may recompute a new network topology to detect an alternate path to forward the traffic. For the duration of the new topology computation, the multicast traffic may either be flooded to all paths to ensure continuation of traffic to multicast receivers, or dropped until the multicast receivers are relearned using the new STP topology. All multicast group addresses from the path that became disabled may be flushed and a new recipient list of multicast group receivers may be learned on the new active path (e.g., the protection path). This behavior may be undesirable as it may lead to excessive flooding, oversubscription, and dropped traffic.

SUMMARY

In accordance with a particular embodiment of the present disclosure, a method is provided for communicating multicast traffic. The method may include in response to receipt of multicast control traffic at a network element to be communicated to a protection switching group, communicating the multicast control traffic to each of a working path and a protection path of the protection switching group. The method may also include in response to receipt of multicast control traffic via either of the working path and the protection path, processing the multicast control traffic as if the multicast control traffic was received via both the working path and the protection path.

Technical advantages of one or more embodiments of the present invention may provide for interoperability of spanning tree protocol and similar protocols with protection switching.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
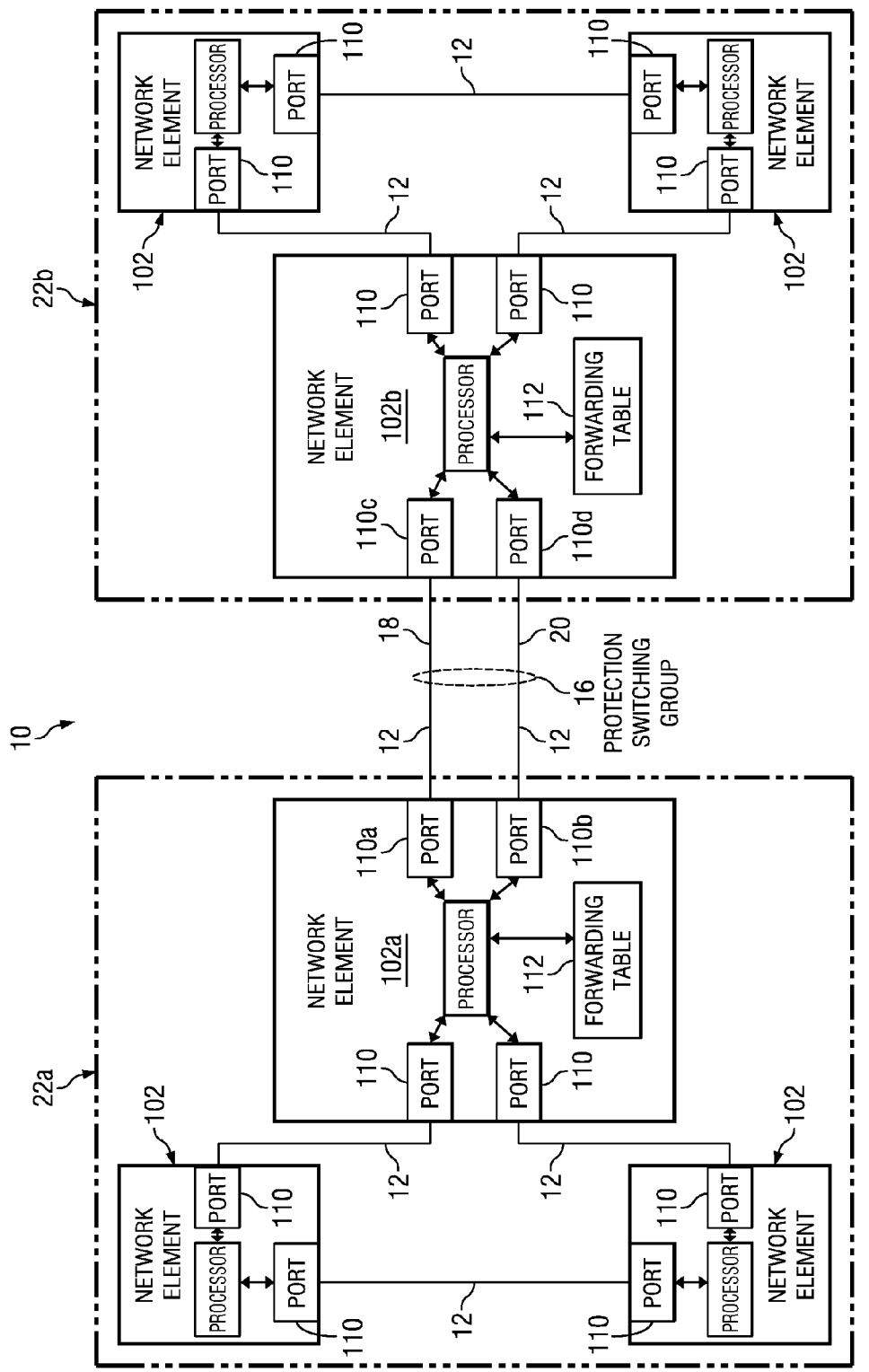
FIG. 1 is a block diagram illustrating an example network, in accordance with certain embodiments of the present disclosure.

FIG. 1 illustrates a block diagram of an example network 10, in accordance with certain embodiments of the present disclosure. In certain embodiments, network 10 may be an Ethernet network. In the same or alternative embodiments, network 10 may be an optical network. Network 10 may include one or more links 12 coupling various components of network 10. The components of network 10, coupled together by links 12, may include a plurality of network elements 102. Although network 10 is shown as a point-to-point network, network 10 may also be configured as a ring network, a mesh network, or any other suitable network or combination of networks. Network 10 may be used in a short-haul metropolitan network, a long-haul inter-city network, or any other suitable network or combination of networks.

Links 12 may comprise transmission media operable to transport one or more signals communicated by components of network 10 and/or one or more intermediate network elements 102. A transmission medium may include any system, device, or apparatus configured to communicatively couple network devices 102 to each other and communicate information between corresponding network devices 102. For example, a transmission medium may include an optical fiber, an Ethernet cable, a T1 cable, a WiFi signal, a Bluetooth signal, or other suitable medium.

Network 10 may communicate information or "traffic" over links 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. A network element 102 may be operable to transmit traffic directly to one or more other network elements 102 and receive traffic directly from the one or more other network elements 102. In certain embodiments, a network element 102 may comprise a switch configured to switch data received by the network element 102 to another device (e.g., another network element 102) coupled to the network element 102, as in a Level 2 and/or bridging network, for example. In other embodiments, a network element 102 may comprise a router configured to route data received by the network element 102 to another device (e.g., another network element 102) coupled to the network element 102, as in a Level 3 network.

As shown in FIG. 1, a network element 102 may include one or more ports 110 and a forwarding table 112. A port 110 may include any suitable system, apparatus, or device configured to serve as an interface between a network element 102 and a link 12. A port 110 may enable its associated network element 102 to communicate to other network elements 102 using any suitable transmission protocol and/or standard. A port 110 may comprise an Ethernet port, an optical port, or any other suitable port. A forwarding table 112 may include a table, map, database, or other data structure for associating each port 110 with one or more other network entities (e.g., another network element 102) using media access control (MAC) addresses, VLAN information, and/or other appropriate information. In some embodiments, forwarding table 112 may also include a multicast receiver list indicating membership of multicast receivers in multicast groups.

Also as shown in FIG. 1, network elements 102 may be distributed among sites 22 (e.g., sites 22a and 22b). In certain embodiments, a site 22 may represent a geographic location. For example, in some embodiments sites 22 may be metro Ethernet sites and network elements 102 may be metro Ethernet switches.

As depicted in FIG. 1, network elements 102a and 102b may be communicatively coupled via a protection switching group 16. Protection switching group 16 may comprise a working path 18 and a protection path 20. In operation, each of working path 18 and protection path 20 may be monitored (e.g., by network elements 102 coupled to such path, on both ends of the path), and if a failure is detected on working path 18, a network element 102 or another component of network 10 may initiated a protection switch whereby network traffic may be switched to protection path 20. In some embodiments, protection switching group 16 may be implemented, provisioned, and/or maintained in accordance with the ITU G.8031 standard.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

System 10 may be used to communicate multicast traffic via components of system 10. Generally speaking, multicast refers to a method of communicating traffic to a group of one or more interested receivers in a single transmission. Multicast traffic may comprise multicast control traffic and multicast data traffic. Multicast control traffic is typically traffic associated with implementing, provisioning, and/or maintaining multicast groups and configuring network elements for communication of multicast data traffic. On the other hand, multicast data traffic is traffic communicated from a sender to one or more receivers.

In operation, in order to enable improved interoperability of STP (or similar protocols) and protection switching for multicast traffic, network elements 102 interfaced to protection switching groups 16 (e.g., network elements 102a and 102b) may: (i) in response to receipt of multicast control traffic (e.g., multicast protocol packets) to be communicated (e.g., forwarded and/or routed) to a protection switching group 16, communicate (e.g., forward and/or route) the control traffic to both the working path 18 and protection path 20 of the protection switching group 16; and/or (ii) in response to receipt of multicast control traffic from a protection switching group 16, process the control traffic as if the control traffic was received via both of the working path 18 and protection path 20 of the protection switching group 16. Such processing by a network element 102 of multicast control traffic received via a protection switching group 16 may include updating a forwarding table 112 of the network element 102 as if both paths of the protection switching group 16 are active, and the multicast control traffic was received from both paths, despite the fact that only one path may remain active at a time. Accordingly, when a network element 102 communicates data traffic over a protection switching group 16, it may, based on information in forwarding table 112, communicate one copy of such traffic to the working path 18 and one copy of such traffic to the protection path 20. If no path switching has occurred, the working path copy may be received at its destination while the protection path copy may be dropped. If path switching occurs, no changes are needed to forwarding table 112 and the network element 102 may continue to communicate a copy via each of working path 18 and protection path 20 such that the working path copy is dropped and the protection path copy reaches its destination. In addition, STP may be disabled for the protection switching group 16 such that STP does not interfere with protection switching. The operation of system 10 and its various components are further illustrated below with reference to FIGS. 2A-2D.

Figure 2A:
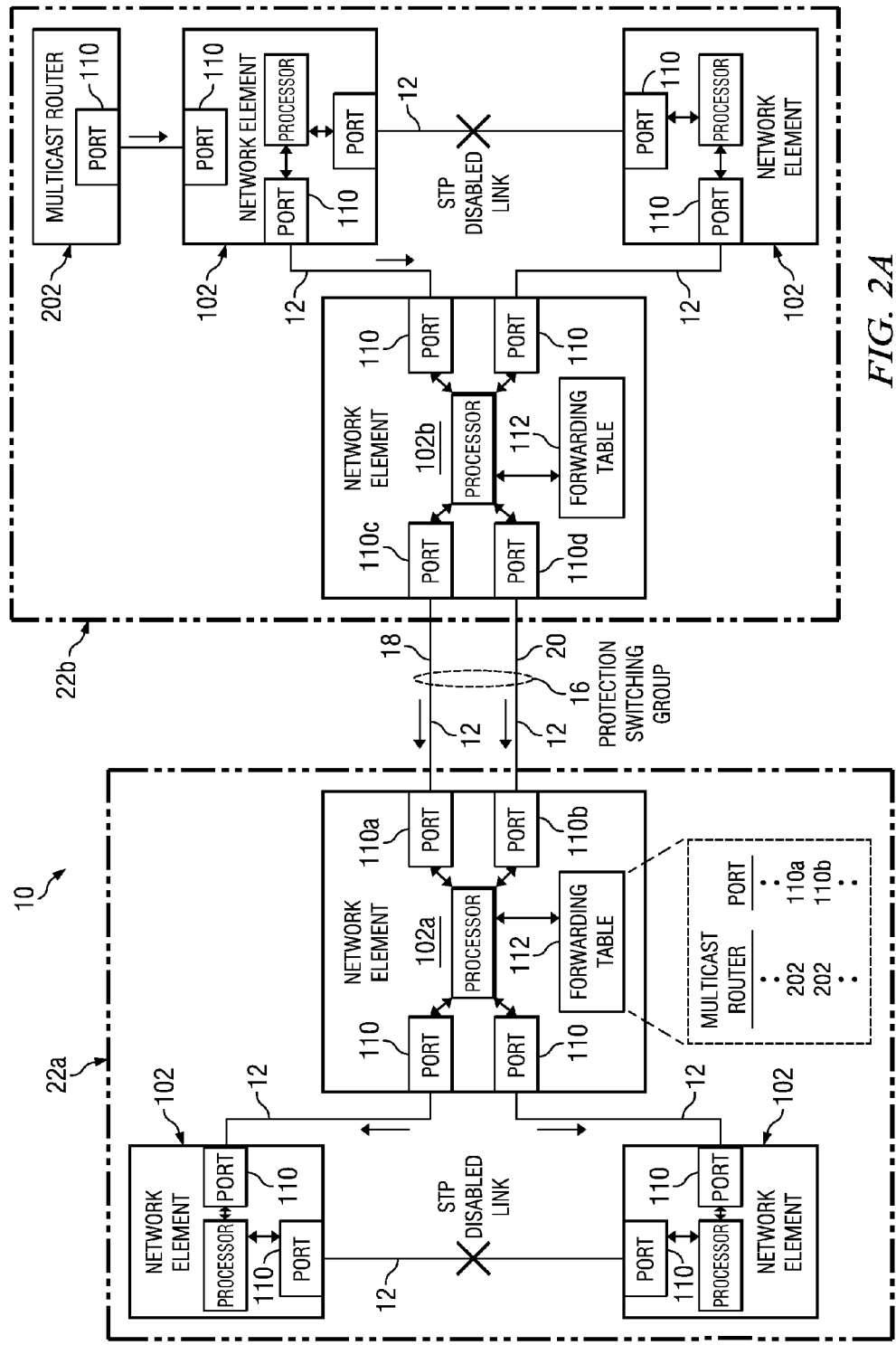
FIGS. 2A-2D are block diagrams illustrating communication and processing of multicast traffic in the example network of FIG. 1, in accordance with certain embodiments of the present disclosure.

FIGS. 2A-2D are block diagrams illustrating communication and processing of multicast traffic in example network 10, in accordance with certain embodiments of the present disclosure. FIG. 2A illustrates example network 10 of FIG. 1, with a multicast router 202 at site 22b. Multicast router 202 may be any system, device or apparatus (including, without limitation, a network element) configured to perform multicast traffic forwarding in network 10. In certain embodiments, multicast router 202 may perform various functions including, without limitation, Internet Group Management Protocol (IGMP) querying functionality to periodically communicate general inquiries and group-specific inquiries. Multicast router 202 may communicate multicast control traffic (e.g., multicast protocol packets for functioning of multicast routing, such as IGMP queries, Protocol Independent Multicast (PIM) hello messages) as indicated in FIG. 2A by the arrow pointing away from multicast router 202. Multicast control traffic originating at multicast router 202 may be received at network element 102b, which is interfaced to protection switching group 16. In response receipt of multicast control traffic, network element 102b may communicate the multicast control traffic to both working path 18 and protection path 20 of protection switching group 16. Because protection switching may keep only one of working path 18 and protection path 20 active, the multicast control traffic may reach network element 102a on one of the paths, while multicast control traffic may be dropped on the other path. In response to receipt of the multicast control traffic, network element 102a may process the multicast control traffic as if it were received via each of working path 18 and protection path 20, despite the fact that it may have only been received via one path. For example, as shown in FIG. 2A, network element 102a may create entries in its forwarding table 112 indicating that multicast router 202 is reachable via port 110a interfaced with working path 18 and via port 110b interfaced with protection path 20. Network element 102a may also further communicate multicast control packets via all active links 12 coupled to network element 102a, so that all network elements 102 may learn based on the information in the multicast control packets (e.g., learn about which of their respective ports 110 multicast router 202 may be reached).

Figure 2B:
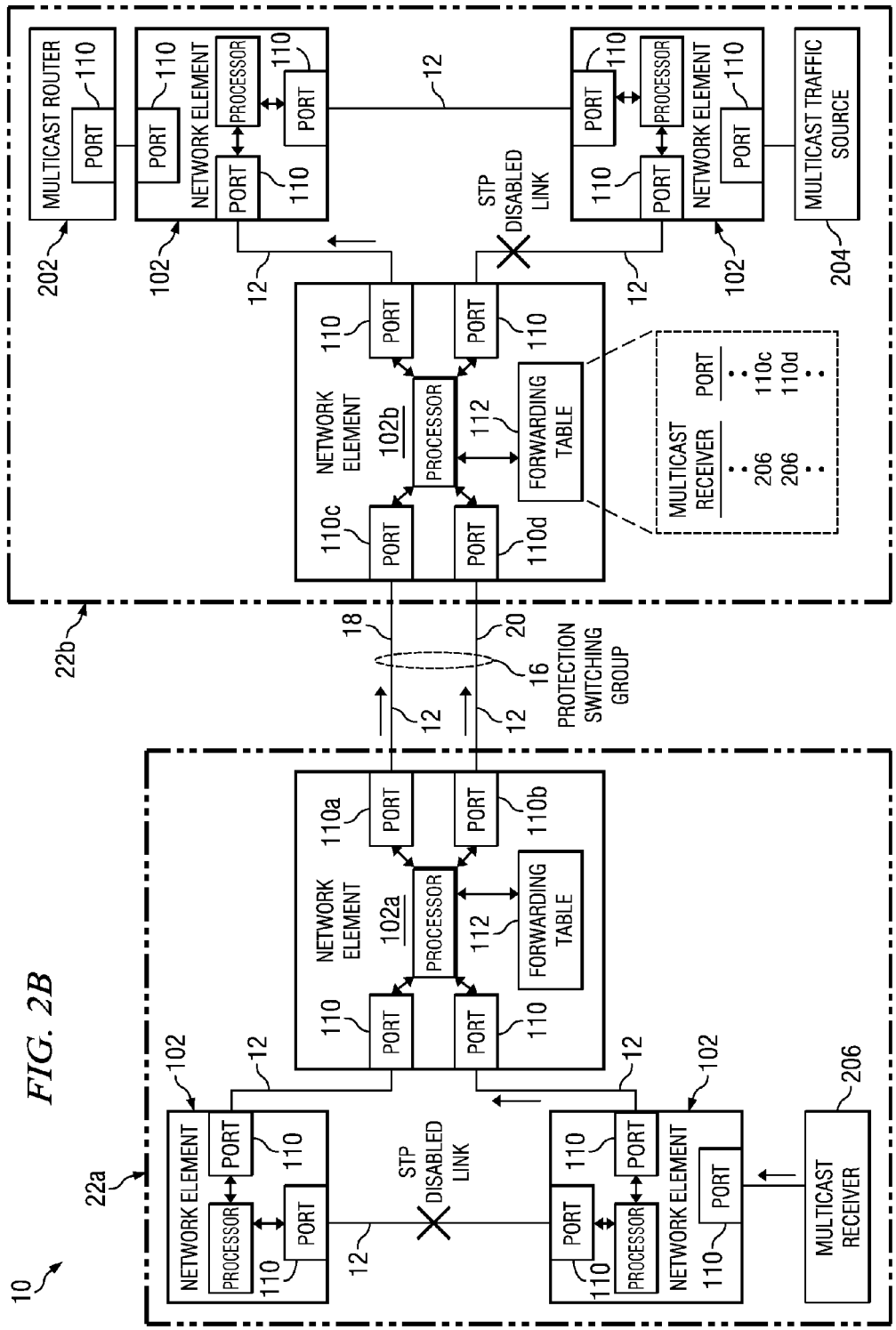

FIG. 2B illustrates example network 10 of FIG. 2A, with a multicast traffic source 204 at site 22b and a multicast receiver 206 at site 22a. Multicast traffic source 204 may include any system, device or apparatus (including, without limitation, a network element) configured to communicate multicast data traffic to other components of network 10. Multicast receiver 206 may include any system, device, or apparatus (including, without limitation, a network element) configured to receive multicast data traffic originating from a multicast traffic source 204. Multicast traffic source 204 may send multicast traffic to a multicast group. To receive data traffic for such multicast group, multicast receiver 206 may communicate multicast control traffic (e.g., an IGMP Join message) indicating that multicast receiver "desires" to receive the multicast group traffic. The multicast control traffic may be received by network element 102a. Based on its forwarding table 112 entries (e.g., forwarding table 112 entries made in accordance with the discussion of FIG. 2A, above), network element 102a may be aware that multicast router 202 may be reached via both ports 110a and 110b (e.g., network element 102a is aware that ports 110a and 110b are interfaced to protection switching group 16). Accordingly, network element 102a may forward the multicast control traffic via both ports 110a and 110b. Because only one of working path 18 and protection path 20 is active, only one copy of the multicast control traffic may reach network element 102b. In response to receiving the multicast control traffic originating from multicast receiver 206, network element 102b may process the multicast control traffic as it were received over both working path 18 and protection path 20. For example, as shown in FIG. 2B, network element 102b may create entries in its forwarding table 112 indicating that multicast receiver 206 is reachable via port 110c interfaced with working path 18 and via port 110d interfaced with protection path 20. Network element 102b may then forward the multicast control traffic in accordance with multicast routing rules.

Notably, similar processing to that described above with respect to FIG. 2B may be utilized if a multicast receiver 206 communicates multicast control traffic indicating its desire to no longer receive multicast data traffic from the multicast group comprising multicast traffic source 204 (e.g., an IGMP Leave message), with the exception that forwarding table 112 entries associating multicast receiver 206 to ports 110c and 110d of network element 102b may be deleted (rather than created), if there is no other receiver for the multicast group in the same path.

Figure 2C:
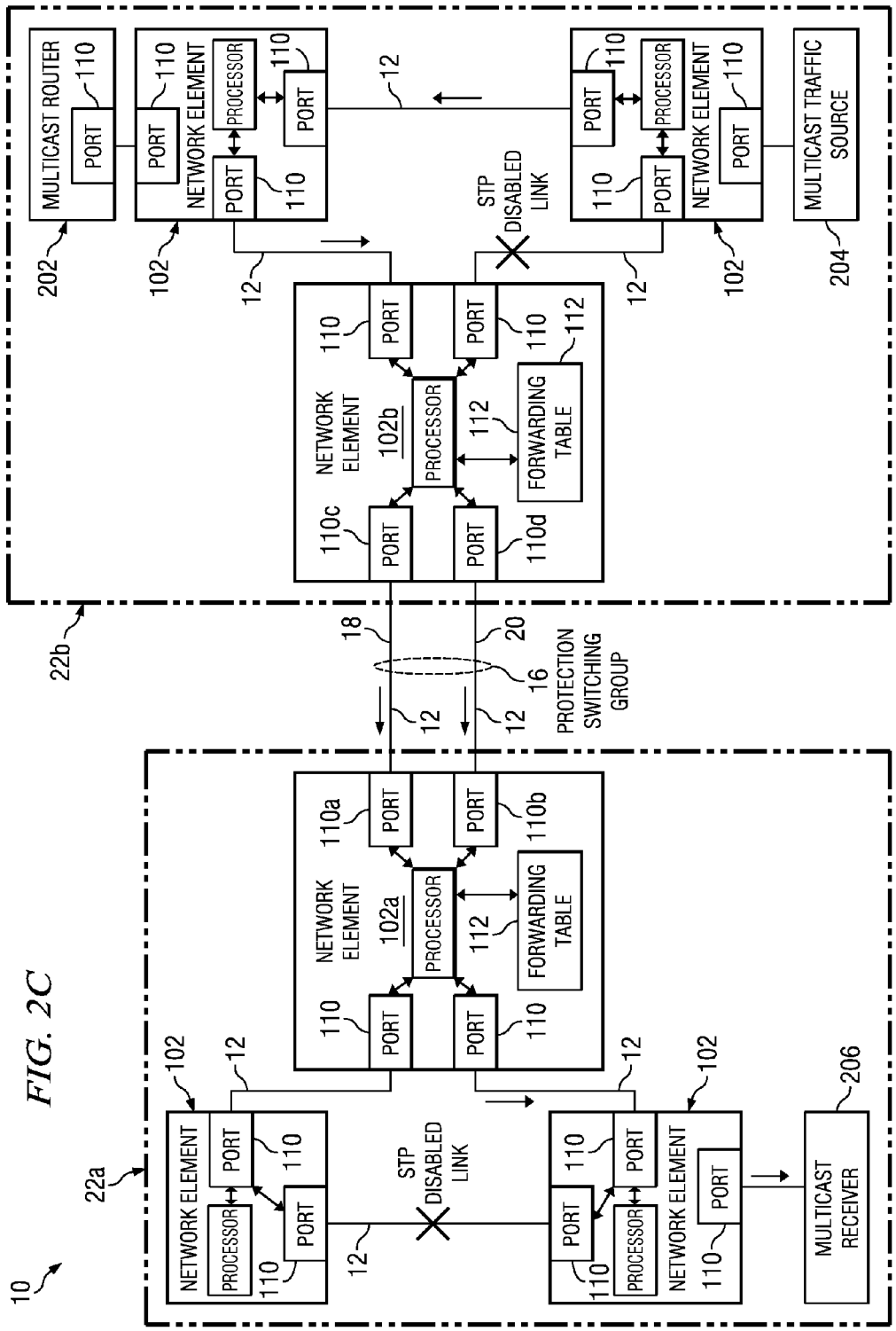

FIG. 2C illustrates the example network 10 of FIG. 2B, depicting communication of multicast data traffic from multicast traffic source 204. As shown by arrows in FIG. 2C, multicast data traffic may be streamed from multicast traffic source 204 to network element 102b. Based on its forwarding table 112 entries (e.g., forwarding table 112 entries made in accordance with the discussion of FIG. 2B, above), network element 102b may forward the multicast data traffic via both ports 110c and 110d. Because only one of working path 18 and protection path 20 is active, only one copy of the multicast data traffic may reach network element 102a. Network element 102a may then forward the multicast data traffic in accordance with multicast routing rules, and the multicast data traffic may ultimately reach multicast receiver 206.

Figure 2D:
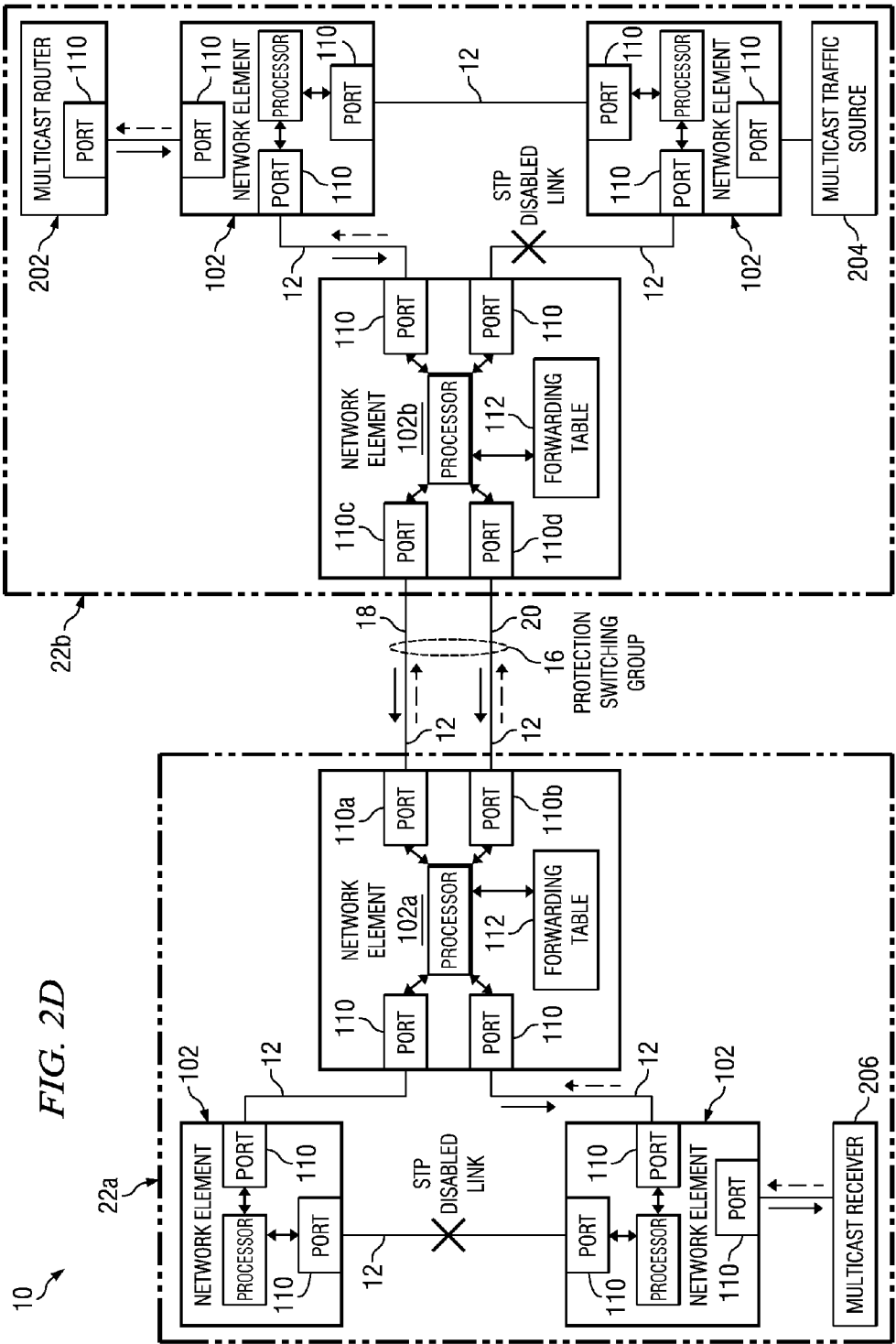

FIG. 2D illustrates the example network 10 of FIG. 2B, depicting communication of multicast control traffic from multicast router 202 for querying multicast receivers 206 (e.g. an IGMP Query message). Such querying control traffic may include a message to determine which multicast receivers 206 still "desire" to receive multicast data traffic. Such messages may be communicated so as to not continue to send multicast data traffic to multicast receivers 206 that may have crashed or left a multicast group silently without specifically sending a message (e.g., an IGMP Leave message) indicating departure from the multicast group. As indicated by solid arrows in FIG. 2D, a multicast querying control traffic originating from multicast router 202 may reach network element 102b. Based on its forwarding table 112 entries (e.g., forwarding table 112 entries made in accordance with the discussion of FIG. 2B, above), network element 102b may forward the multicast querying control traffic via both ports 110c and 110d. Because only one of working path 18 and protection path 20 is active, only one copy of the multicast querying control traffic may reach network element 102a. In response to receiving the multicast querying control traffic, network element 102a may refresh entries in its forwarding table 112 indicating that multicast router 202 is reachable via port 110a interfaced with working path 18 and via port 110b interfaced with protection path 20. Network element 102a may then forward the multicast querying control traffic in accordance with multicast routing rules, and the multicast data traffic may ultimately reach multicast receiver 206. If multicast receiver 206 still desires to receive data traffic for the multicast group, it may reply with multicast control traffic indicating its desire to continue to receive data traffic (e.g., an IGMP Report message). Such multicast control traffic indicating a desire to continue to receive data traffic may be processed by various components of network 10 in a manner similar or identical to that depicted in FIG. 2B.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Although the present invention has been described with several embodiments, various changes and modifications may be suggested to one skilled in the art. It is intended that the present invention encompass such changes and modifications as fall within the scope of the appended claims.

What is claimed is:

1. A method for communicating multicast control traffic, comprising:
    in response to receipt of first multicast control traffic at a network element to be communicated to one or more other network elements via a protection switching group, communicating the first multicast control traffic to each of a working path and a protection path of the protection switching group; and
    in response to receipt of second multicast control traffic via either of the working path and the protection path, processing the second multicast control traffic as if the second multicast control traffic was received via both the working path and the protection path.

2. A method according to claim 1, wherein processing the second multicast control traffic comprises updating a forwarding table of the network element as if the multicast control traffic was received via both of the working path and the protection path.

3. A method according to claim 1, wherein the second multicast control traffic originates from a multicast router, and processing the second multicast control traffic comprises updating a forwarding table of the network element to indicate that the multicast router is reachable by the network element via a first port interfaced with the working path and a second port interfaced with the protection path.

4. A method according to claim 3, wherein the first multicast control traffic and the second multicast control traffic, each comprises one of an Internet Group Management Protocol query and a Protocol Independent Multicast message.

5. A method according to claim 1, wherein the second multicast control traffic originates from a multicast receiver and indicates a request of a multicast receiver to receive multicast data traffic, and processing the second multicast control traffic comprises updating a forwarding table of the network element to indicate that the multicast receiver is reachable by the network element via a first port interfaced with the working path and a second port interfaced with the protection path.

6. A method according to claim 5, wherein the first multicast control traffic and the second multicast control traffic, each comprises one of an Internet Group Management Protocol Join message and an Internet Group Management Protocol Report message.

7. A method according to claim 1, wherein the second multicast control traffic originates from a multicast receiver and indicates a request of a multicast receiver to cease receiving multicast data traffic, and processing the second multicast control traffic comprises updating a forwarding table of the network element to delete entries indicating that the multicast receiver is reachable by the network element via a first port interfaced with the working path and a second port interfaced with the protection path.

8. A method according to claim 7, wherein the first multicast control traffic and the second multicast control traffic, each comprises an Internet Group Management Protocol Leave message.

9. A network element, comprising:
    a plurality of ports interfacing the network element to one or more other network elements, including at least two of the plurality ports respectively configured to communicate traffic via a working path and via a protection path of a protection switching group coupling the network element to the one or more other network elements; and
    a forwarding table indicating connectivity of the network element to the one or more other network elements;
    wherein the network element is configured to:
    in response to receipt of first multicast control traffic to be communicated to the one or more other network elements via the protection switching group, communicate the first multicast control traffic to the one or more other network elements via each of the working path and the protection path; and
    in response to receipt of second multicast control traffic from one or more of the other network elements via either of the working path and the protection path, process the second multicast control traffic as if the second multicast control traffic was received via both the working path and the protection path.

10. A network element according to claim 9, the network element further configured to process the second multicast control traffic by updating the forwarding table of the network element as if the multicast control traffic was received via both of the working path and the protection path.

11. A network element according to claim 9, wherein the second multicast control traffic originates from a multicast router, and the network element is further configured to process the second multicast control traffic by updating the forwarding table of the network element to indicate that the multicast router is reachable by the network element via a first port interfaced with the working path and a second port interfaced with the protection path.

12. A network element according to claim 11, wherein the first multicast control traffic and the second multicast control traffic, each comprises one of an Internet Group Management Protocol query and a Protocol Independent Multicast message.

13. A network element according to claim 9, wherein the first multicast control traffic originates from a multicast receiver and indicates a request of the multicast receiver to receive multicast data traffic, and the network element is further configured to process the first multicast control traffic by updating the forwarding table of the network element to indicate that the multicast receiver is reachable by the network element via a first port interfaced with the working path and a second port interfaced with the protection path.

14. A network element according to claim 13, wherein the first multicast control traffic and the second multicast control traffic, each comprises one of an Internet Group Management Protocol Join message and an Internet Group Management Protocol Report message.

15. A network element according to claim 9, wherein the first multicast control traffic originates from a multicast receiver and indicates a request of the multicast receiver to cease receiving multicast data traffic, and the network element is further configured to process the first multicast control traffic by updating the forwarding table of the network element to delete entries indicating that the multicast receiver is reachable by the network element via a first port interfaced with the working path and a second port interfaced with the protection path.

16. A network element according to claim 15, wherein the first multicast control traffic and the second multicast control traffic, each comprises an Internet Group Management Protocol Leave message.

17. A non-transitory computer-readable medium comprising logic for communicating multicast control traffic, the logic configured, when executed, to:
   communicate first multicast control traffic to each of a working path and a protection path of a protection switching group coupling a first network element and a second network element in response to receipt of the first multicast control traffic at the first network element to be communicated to the second network element via the protection switching group; and
   process second multicast control traffic received at the first network element from the second network element as if the second multicast control traffic was received via both the working path and the protection path in response to receipt of the second multicast control traffic via either of the working path and the protection path.

18. A non-transitory computer-readable medium according to claim 17, wherein processing the second multicast control traffic comprises updating a forwarding table of the network element as if the multicast control traffic was received via both of the working path and the protection path.

19. A non-transitory computer-readable medium according to claim 17, wherein the second multicast control traffic originates from a multicast router, and wherein processing the second multicast control traffic comprises updating a forwarding table of the network element to indicate that the multicast router is reachable by the network element via a first port interfaced with the working path and a second port interfaced with the protection path.

20. A non-transitory computer-readable medium according to claim 17, wherein the first multicast control traffic originates from a multicast receiver and indicates a request of the multicast receiver to receive multicast data traffic, and wherein processing the first multicast control traffic comprises updating a forwarding table of the network element to indicate that the multicast receiver is reachable by the network element via a first port interfaced with the working path and a second port interfaced with the protection path.

21. A non-transitory computer-readable medium according to claim 17, wherein the first multicast control traffic originates from a multicast receiver and indicates a request of the multicast receiver to cease receiving multicast data traffic, and wherein processing the first multicast control traffic comprises updating a forwarding table of the network element to delete entries indicating that the multicast receiver is reachable by the network element via a first port interfaced with the working path and a second port interfaced with the protection path.

* * * * *